(12) United States Patent
Monjean et al.

(10) Patent No.: US 9,525,362 B2
(45) Date of Patent: Dec. 20, 2016

(54) POWER SUPPLY FOR A CHARGE AND ELECTRICITY PRODUCTION PLANT

(71) Applicant: GE Energy Power Conversion Technology Ltd., Rugby, Warwickshire (GB)

(72) Inventors: Pascal Monjean, Marcq en Barouel (FR); Jerome Auguste, Sausheim (FR)

(73) Assignee: GE Energy Power Conversion Technology, Ltd., Rugby, Warwickshire (GB)

( * ) Notice: Subject to any disclaimer, the term of this patent is extended or adjusted under 35 U.S.C. 154(b) by 171 days.

(21) Appl. No.: 13/766,496

(22) Filed: Feb. 13, 2013

(65) Prior Publication Data

US 2013/0208522 A1 Aug. 15, 2013

(30) Foreign Application Priority Data

Feb. 13, 2012 (FR) ..................... 12 51317

(51) Int. Cl.
*H02M 3/335* (2006.01)
*H02M 3/337* (2006.01)
(Continued)

(52) U.S. Cl.
CPC ............... *H02M 7/42* (2013.01); *H02J 3/386* (2013.01); *H02J 11/00* (2013.01); *H02M 1/10* (2013.01); *H02J 3/382* (2013.01); *Y02E 10/763* (2013.01)

(58) Field of Classification Search
CPC ............ H02M 3/33569; H02M 3/3376; H02M 5/4585
(Continued)

(56) References Cited

U.S. PATENT DOCUMENTS 6,160,722 A * 12/2000 Thommes et al. .............. 363/37
6,331,365 B1 * 12/2001 King .................... B60L 11/1803
320/103
(Continued)

FOREIGN PATENT DOCUMENTS

JP 2008-154334 A * 3/2008

OTHER PUBLICATIONS

Matsuyama Masatoshi, Oct. 1, 2008 Diaper Changing Support Device JP 2008-000154.*
(Continued)

*Primary Examiner* — Jue Zhang
*Assistant Examiner* — Sisay G Tiku
(74) *Attorney, Agent, or Firm* — Wood IP LLC

(57) ABSTRACT

A power supply system for a charge is provided. The power supply system includes a converter connected in input to a current source and in output to a charge, the converter being able to deliver a direct current to the charge and allow the circulation of the current in a single direction, from the current source to the charge and a circulation bus for an electric current, including a first end and a second end. The power supply system further includes a device for injecting an additional alternating voltage and at the second end of the circulation bus, the injection device being connected to the second end and a device for recovering the additional injected alternating voltage, the recovery device being connected between the first end of the bus and the charge, so as to supply the charge with electrical current.

8 Claims, 2 Drawing Sheets

(51) Int. Cl.
*H02M 5/458* (2006.01)
*H02M 7/08* (2006.01)
*G05F 1/585* (2006.01)
*H02M 7/42* (2006.01)
*H02M 1/10* (2006.01)
*H02J 3/38* (2006.01)
*H02J 11/00* (2006.01)

(58) Field of Classification Search
USPC ............. 363/15, 16, 17, 37, 65, 67, 69, 142;
307/24; 320/134
See application file for complete search history.

(56) References Cited

U.S. PATENT DOCUMENTS

| | | | |
|---|---|---|---|
| 8,146,513 B2* | 4/2012 | Ibaiondo Madariaga et al. | 104/289 |
| 8,698,354 B2* | 4/2014 | Ghosh | H02J 9/062 307/66 |
| 2002/0109406 A1* | 8/2002 | Aberle | B60L 11/1851 307/10.1 |
| 2005/0006958 A1* | 1/2005 | Dubovsky | 307/64 |
| 2005/0105306 A1* | 5/2005 | Deng et al. | 363/37 |
| 2005/0201127 A1* | 9/2005 | Tracy | H02J 9/062 363/37 |
| 2006/0224360 A1* | 10/2006 | Kishimoto | B60L 3/0023 702/183 |
| 2008/0067872 A1* | 3/2008 | Moth | H02J 9/062 307/23 |
| 2009/0289504 A1* | 11/2009 | Ho | H02J 9/005 307/66 |
| 2010/0133912 A1* | 6/2010 | King | B60L 1/003 307/82 |
| 2010/0141213 A1* | 6/2010 | Iida | B60L 1/00 320/134 |

OTHER PUBLICATIONS

Hitachi Home & Life Solutions Inc, Shinohara Katsutoshi, Systematically Interconnecting Power Supply System JP 2004-180467.*

* cited by examiner

POWER SUPPLY FOR A CHARGE AND ELECTRICITY PRODUCTION PLANT

Priority is hereby claimed to FR Patent Application No. 12 51317 filed on Feb. 13, 2012, the entire disclosure of which is hereby incorporated by reference herein.

The present invention relates to a power supply system for a charge the system including a converter adapted to be connected in input to a current source and in output to the charge, the converter being able to deliver a direct current to the charge and allow the circulation of the current in a single direction, from the current source to the charge, and a circulation bus for an electric current, including a first end and a second end.

BACKGROUND OF THE INVENTION

Such a power supply system is known from chapter 5.3 of the thesis by Christoph Meyer, entitled "Key Components for Future Offshore DC Grids." The converter converts a direct current into another direct current, connected in input to a direct current source and delivering a direct current in output on the direct bus. The direct-direct converter includes an inverter connected to the primary of a transformer, and the current is then rectified through a unidirectional diode bridge, the current circulating only from the direct input source to the direct bus connected in output of the converter.

The direct circulation bus of the electrical current is a so-called high-voltage bus, having a voltage with a value higher than 1 kV. The circulation bus makes it possible to connect the current source and the converter arranged in a wind turbine, on the one hand, to a remote electrical grid on the other hand. The circulation bus includes wired electrical connections, which then have a length for example greater than several hundred meters. The converter and the current source are for example arranged offshore, and the electrical grid to which they are connected by means of the circulation bus is arranged onshore.

However, when the current source does not provide energy, for example in the absence of wind in the case of a wind turbine, auxiliary equipment such as sensors, measurement equipment, or surveillance equipment is no longer powered by the current source, and also cannot be powered by the electrical grid due to the single circulation direction of the direct current on the bus, from the source to the network.

SUMMARY OF THE INVENTION

An object the present invention may provide an electrical supply system making it possible to supply a charge when the current source connected in input of the converter is not supplying current, while not having to deploy a specific wired electrical connection between the charge and an onshore electrical grid.

The present invention provides a power supply system including a converter adapted to be connected in input to a current source and in output to the charge, the converter being able to deliver a direct current to the charge and allow the circulation of the current in a single direction, from the current source to the charge, and a circulation bus for an electric current, including a first end and a second end. The power supply system also includes a device for injecting additional alternating voltage and at the second end of the circulation bus, the injection device being connected to said second end, and a device for recovering the additional injected alternating voltage, the recovery device being connected between the first end of the bus and the charge, so as to supply the charge with electrical current.

According to other advantageous aspects of the invention, the power supply system may include one or more of the following features, considered alone or according to all technically possible combinations:

- the injection device includes controllable electrical connection means with an alternating voltage source;
- the controllable connection means include a wired connection between the alternating voltage source and the circulation bus, and a breaker movable between an open position and a closed position and capable of short-circuiting the wired connection in the closed position;
- the controllable connecting means include an alternating transformer connected between the alternating voltage source and the circulation bus;
- the injection device includes a voltage inverter connected to the second end of the circulation bus, the inverter being able to deliver the additional alternating voltage from a grid to which it is designed to be connected;
- the recovery device includes a suppression filter for suppressing the direct component of a voltage, such as a capacitor;
- the recovery device also includes an alternating transformer connected in output to the filter;
- the system also comprises a conversion device for converting the additional alternating voltage into a direct voltage, the conversion device being connected between the recovery device and the charge, so as to supply the charge with direct current;
- the conversion device includes a diode bridge connected in output to the recovery device; and
- the conversion device also includes a filtering capacitor connected in output to the diode bridge.

The present invention further provides an electricity production plant adapted to be connected to an electrical grid, the production plant including an electrical current generator, a circulation bus for the electrical current, connected between the generator and the grid, and a power supply system for auxiliary equipment. The power supply system is as defined above, the circulation bus connected between the generator and the grid forming the bus of the supply system.

According to another advantageous aspect of the invention, the production plant may include the following feature:

- the plant also comprises a unidirectional current converter, connected between the generator and the circulation bus, and able to allow the current to circulate in a single direction, from the generator toward the bus.

The present invention also provides an electricity production plant adapted to be connected to an electrical network and comprising such a power supply system.

The present invention, for example, may apply to production plants arranged offshore and supplying the produced electricity to an onshore electrical grid.

The present invention, for example, may apply to marine turbines, capable of generating electricity from the hydraulic energy of a waterway, or wind turbines.

BRIEF DESCRIPTION OF THE DRAWINGS

These features and advantages of the invention will appear upon reading the following description, provided solely as a non-limiting example, and done in reference to the appended drawings, in which.

DETAILED DESCRIPTION OF THE PREFERRED EMBODIMENTS

Figure 1:
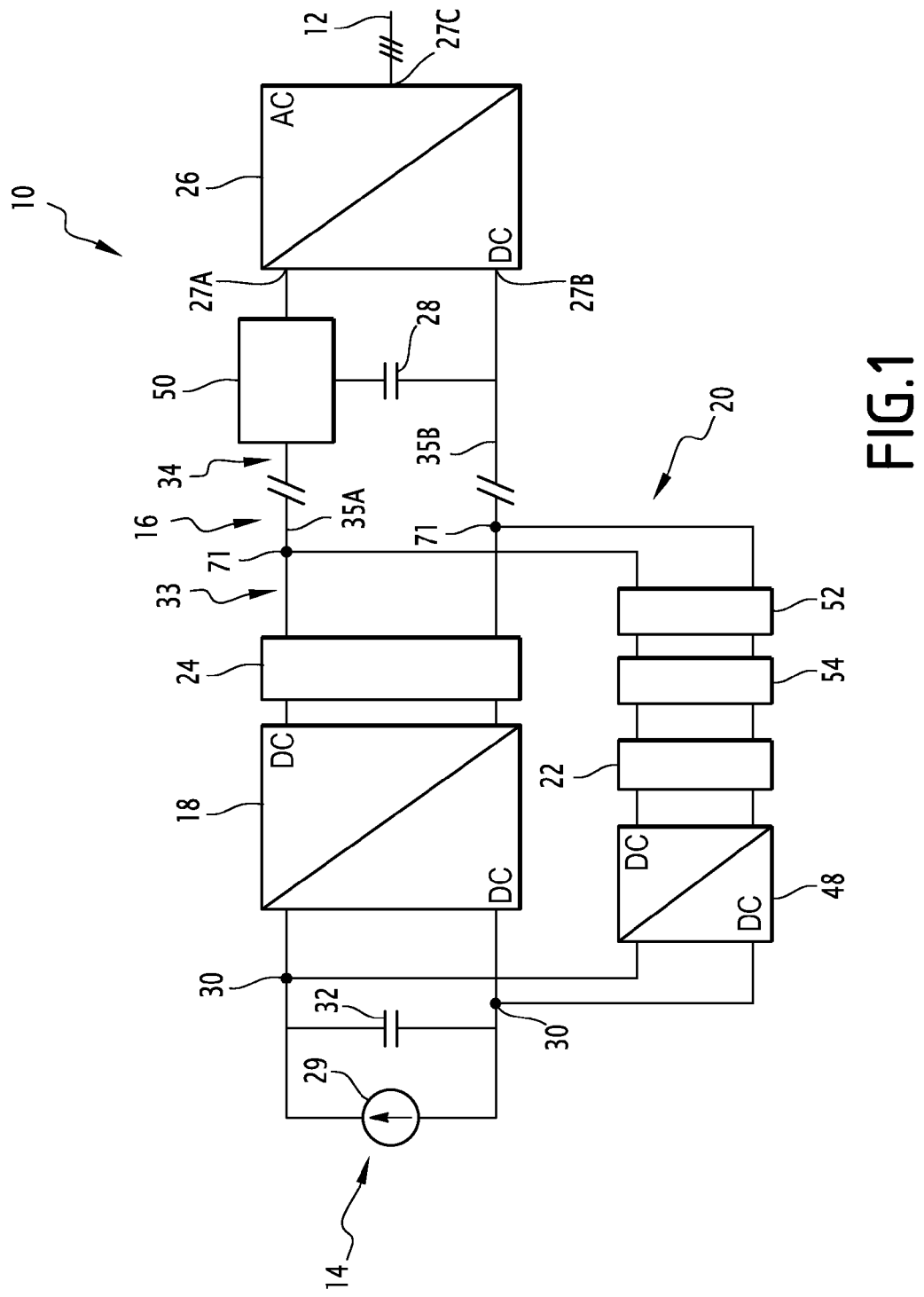
FIG. 1 is a schematic view of a production plant according to an embodiment of the present invention.

In FIG. 1, an electricity production plant 10 is connected to an electrical grid 12.

The production plant 10 comprises a generator 14 generating electrical current, a bus 16 for circulating the electrical current between the generator 14 and the electrical grid 12, and a primary converter 18 connected between the generator 14 and the circulation bus 16. The production plant 10 also comprises a power supply system 20 for supplying electricity to at least one piece of auxiliary equipment 22.

Additionally, the production plant 10 comprises a passive filter 24 connected between the primary converter 18 and the circulation bus 16.

Additionally, when the electrical grid 12 is an alternating grid, the production plant 10 comprises a voltage inverter 26 connected between the circulation bus 16 and the grid 12, the inverter 26 including a positive input terminal 27A, a negative input terminal 27B and an output terminal 27C for each phase of the alternating grid 12.

The production plant 10 comprises a balancing capacitor 28 connected between the input terminals 27A, 27B of the inverter.

The production plant 10 is, for example, a marine turbine and includes a stator, a rotatable rotor equipped with a plurality of blades, and a hose. The marine turbine is adapted to convert the kinetic energy from a waterway circulating inside the hose into electricity, the pressure from the waterway on the blades rotating the rotor, and the rotation of the rotor relative to the stator generating electricity. The marine turbine is an underwater marine turbine designed to use the kinetic energy from the sea currents, or is submerged in a waterway so as to convert the hydraulic energy from the waterway into electricity.

Alternatively, the production plant 10 may be a wind turbine including a stator and rotor equipped with a plurality of blades. The air currents bearing on the blades being able to rotate the rotor, and the rotation of the rotor relative to the stator also creating electricity.

The production plant 10 is adapted to deliver a voltage of more than 1 kV on the circulation bus 16, for example, greater than 5 kV, for example, also greater than 10 kV.

The electricity supplied by the production plant 10 to the grid 12 is greater than 1 MW, preferably greater than 4 MW, also preferably greater than 8 MW.

The electrical grid 12 is, for example, an alternating grid, such as a three-phase grid. The voltage of the grid 12 is approximately 20 kV.

The generator 14 is a direct current generator. The generator 14 includes a current source 29 capable of delivering a direct current between the first terminals 30 and a first filtering capacitor 32 connected in parallel to the current source 29 between the first terminals 30.

In the described embodiment, the current source 29 is formed by the stator, the rotor and a rectifier connected in output to the stator in order to convert the alternating current generated by the stator into a direct current.

The circulation bus 16 has a first end 33 on the generator 14 side, and a second end 34 on the grid 12 side. In the example embodiment of FIGS. 1 and 2, the first end 33 is connected to the passive filter 24 and the second end 34 is connected to the voltage inverter 26.

The circulation bus 16 comprises a wired electrical connection including two electrical conductors 35A, 35B, i.e., a positive conductor 35A and a negative conductor 35B. The conductors 35A, 35B have a length with a value greater than several hundred meters.

Figure 2:
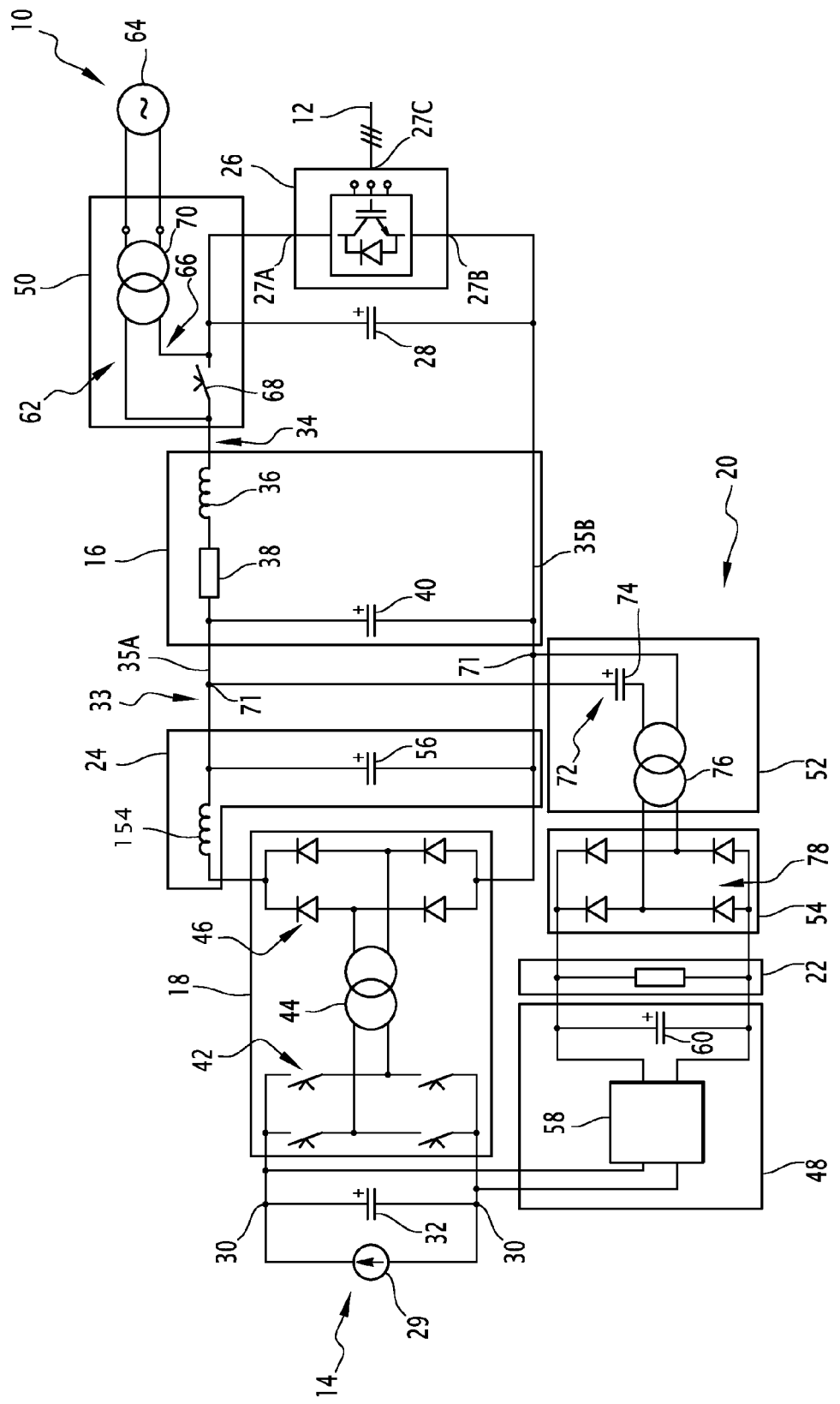
FIG. 2 is electrical diagram of the plant of FIG. 1.

The circulation bus 16 is modeled in the form of a line inductance 36 serially connected with a line resistance 38, and a line capacitor 40 connected between the conductors 35A, 35B on the line resistance 38 side, as shown in FIG. 2. In other words, the circulation bus 16 is modeled in the form of a pi-shaped segment, for example.

The circulation bus 16 is adapted to allow the circulation of a current with a voltage above 1 kV, for example greater than 5 kV, also for example greater than 10 kV. The primary converter 18 is a unidirectional current converter, able to allow the current to circulate in a single direction from the generator 14 to the circulation bus 16. In the described embodiment, the primary converter 18 converts direct current into another direct current.

The primary converter 18 includes a controlled H-shaped bridge 42 forming a voltage inverter, connected in input to a first voltage transformer 44, which in turn is connected in input to a diode bridge 46 forming a voltage rectifier. The H-shaped bridge 42 is connected to the first terminals 30, and the diode bridge 46 is connected to the passive filter 24 so as to be connected to the circulation bus 16.

The power supply system 20 comprises an auxiliary converter 48 connected between the generator 14 and the piece(s) of auxiliary equipment 22 on the one hand, and on the other hand, a device 50 for injecting additional alternating voltage at the second end 34 of the circulation bus, the circulation bus 16 and a device 52, at the first end 33 of the bus, for recovering the additional injected alternating voltage, as shown in FIG. 1.

Additionally, the power supply system 20 comprises a conversion device 54 for converting the additional alternating voltage into a direct voltage, when the supply voltage of the auxiliary equipment 22 is a direct voltage.

The auxiliary equipment 22 must be continuously powered, for example using direct current.

The passive filter 24 includes a filtering inductance 154 connected in the output of the primary converter 18 and a second filtering capacitor 56 connected between the conductors 35 of the bus at the first end 33.

The voltage inverter 26 is known per se, and is adapted to convert the direct current circulating on the bus 16 into an alternating current delivered to the grid 12. In the example embodiment of FIGS. 1 and 2, the grid 12 is a three-phase grid, and the inverter 26 is then a three-phase inverter.

The inverter 26 is for example an inverter of the NPP type (Neutral Point Piloted). Alternatively, the inverter 26 is of the NPC type (Neutral Point Clamped). The auxiliary converter 48 is connected on the one hand to the first terminals 30, and on the other hand to the auxiliary equipment 22.

The auxiliary converter 48 is a unidirectional converter adapted to allow the current to circulate in a single direction, from the current source 29 to the auxiliary equipment 22. The auxiliary converter 48 is adapted to deliver direct current to the auxiliary equipment 22.

In the described embodiment, the auxiliary converter 48 converts direct current into another direct current, the current source 29 being a direct current source.

The auxiliary converter 48 includes a direct-direct unidirectional conversion module 58 and a third filtering capacitor 60 connected in output to the direct-direct module 58, i.e., between the conversion module 58 and the auxiliary equipment 22.

The injection device 50 is connected to the second end 34 of the circulation bus. In the example embodiment of FIG. 2, the injection device 50 is connected to the positive conductor 35A of the circulation bus.

In the example embodiment of FIG. 2, the injection device 50 includes controllable means 62 performing an electrical connection with an alternating voltage source 64.

The controllable connecting means 62 include a wired connection 66 between the alternating voltage source 64 and the circulation bus 16, and a breaker 68 adapted to be moved between an open position and a closed position, the breaker 68 being able, in the closed position, to short-circuit the wired connection 66.

Additionally, the controllable connecting means 62 include a second voltage transformer 70 connected between the alternating voltage source 64 and the circulation bus 16.

Alternatively, the injection device 50 is formed by the voltage inverter 26 able to deliver an additional alternating voltage from the grid 12 to which it is connected. The recovery device 52 is connected to the circulation bus 16 in a branch relative to the primary converter 18 and the passive filter 24. The recovery device 52 is connected to the first end 33 of the circulation bus by means of the second terminals 71.

The recovery device 52 includes a suppression filter 72 for suppressing the direct component of a voltage. The suppression filter 72 is adapted to eliminate the direct component of the voltage at the first end 33. The suppression filter 72 for example includes a capacitor 74 capable of eliminating said direct component. The capacitor 74 is preferably connected to the second terminal 71 corresponding to the positive conductor 35A. Additionally, the recovery device 52 includes a third voltage transformer 76 connected in output to the suppression filter 72. In the example embodiment of FIG. 2, the third transformer 76 is connected between the suppression filter 72 and the conversion device 54.

The recovery device 52 is adapted to supply the auxiliary equipment 22 with electrical current, in particular when the generator 14 does not provide current and the auxiliary equipment 22 is then no longer powered by means of the auxiliary converter 48. The recovery device 52 is arranged in a protective housing, not shown, the protective housing being designed to be submerged. The recovery device 52 is for example arranged in the oil inside the protective case.

The conversion device 54 is connected between the recovery device 52 and the auxiliary equipment 22. The conversion device 54 is adapted to convert the additional alternating voltage coming from the recovery device 52 into a direct voltage, so as to supply a direct voltage to the auxiliary equipment 22.

In the example embodiment of FIG. 2, the conversion device 54 includes a diode bridge 78. Additionally, the conversion device 54 includes a filtering capacitor connected in output of the diode bridge 78. The diode bridge 78 is connected between the third transformer 76 and the auxiliary equipment 22.

The conversion device 54 is arranged in a protective case the protective case being designed to be submerged. The conversion device 54 is for example arranged in an oil bath inside the protective case.

The auxiliary converter 48, the recovery device 52, and the conversion device 54 are connected in parallel with the primary converter 18, between the first terminals 30 on the one hand and the second terminals 71 on the other hand. The operation of the production plant 10 and the power supply system 20 will now be described.

When the current generator 14 delivers a current by means of current source 29, the current circulates primarily through the primary converter 18, the passive filter 24, the circulation bus 16 and lastly the voltage converter 26, so as to be delivered to the three-phase grid 12.

The electrical current supplied by the current generator 14 is also deviated toward the auxiliary converter 48 so as to supply the piece(s) of auxiliary equipment 22. In other words, when the generator 14 produces an electrical current, that current serves to supply the electrical grid 12 on the one hand, and the piece(s) of auxiliary equipment 22 on the other hand, by means of the auxiliary converter 48.

The breaker 68 is in the closed position, so as to allow the circulation of the current on the positive conductor 35A from the current source 29 to the grid 12. The wired connection 66 of the injection device is then short-circuited by the breaker 68.

When the generator 14 does not produce current, for example when the rotor of the marine turbine or wind turbine is stopped, the piece(s) of auxiliary equipment 22 are no longer powered by the auxiliary converter 48.

The breaker 68 is then commanded from its closed position to its open position, so as to allow the injection of an additional alternating voltage from the alternating voltage source 64, through the second voltage transformer 70, up to the circulation bus 16.

The alternating voltage injected on the circulation bus 16 is present from the second end 34 to the first end 33 through the conductors 35A, 35B, then is recovered at the second terminals 71 at the first end 33 by the recovery device 52.

The recovery device 52 filters the direct component of the voltage of the circulation bus 16 using the suppression filter 72 so as to keep only an alternating component, i.e., to recover the additional alternating voltage injected by the injection device 50.

The additional alternating voltage is then adapted to the desired voltage level by means of the third voltage transformer 76. The conversion device 54 lastly converts the additional alternating voltage recovered by means of the recovery device 52 into a direct voltage, so as to power the piece(s) of auxiliary equipment 22.

When the generator 14 again produces current, the breaker 68 is again commanded from its open position to its closed position, the piece(s) of auxiliary equipment 22 then being powered by the auxiliary converter 48.

The power supply system 20 therefore makes it possible to power the piece(s) of auxiliary equipment 22 continuously, including when the generator 14 does not deliver any current.

Furthermore, the recovery device 52 and the conversion device 54 do not include any controllable component, which improves the reliability and maintenance of the power supply system 20, the recovery device 52 and the conversion device 54 being designed to be arranged in one or more submerged and/or isolated cases, which are difficult to access.

The power supply system 20 according to the present invention thus advantageously powers the piece(s) of auxiliary equipment 22 when the generator 14 does not produce any current, in the absence of a specific additional wired connection between an onshore electrical grid and the piece(s) of equipment 22.

One can thus see that the power supply system 20 according to the present invention advantageously powers the piece(s) of auxiliary equipment 22 when the current source 28 connected in input to the auxiliary converter 48 does not supply current, while not having to deploy a specific electrical wired connection between the piece(s) of auxiliary equipment 22 and an onshore electrical grid.

What is claimed is:

1. An auxiliary power supply system connected to a primary power source for providing power to a grid and auxiliary equipment external to the grid, the auxiliary power supply system comprising:
   - a converter connected to a primary power source and configured to receive current therefrom, to power the auxiliary equipment;
   - an injection device configured to (i) circulate current via a circulation bus and (ii) inject an alternating voltage from an alternating voltage source to the circulation bus for supplying power to the auxiliary equipment in the event of power failure of the primary power source, and comprising a controllable electrical connector with a voltage source and including a first transformer connected between the voltage source and the second end of the circulation bus;
   - a recovery device configured coupled to the circulation bus and configured to recover the alternating voltage supplied thereto; and
   - a conversion device configured to convert the alternating voltage to a direct voltage for powering the auxiliary equipment,
   - wherein the auxiliary power supply system is configured to only supply power to the auxiliary equipment.

2. The system according to claim 1, wherein the controllable electrical connector comprises a wired connection between the voltage source and the second end of the circulation bus, and a breaker connected at the second end of the circulation bus.

3. The system according to claim 1, wherein the injection device includes a voltage inverter connected to the second end of the circulation bus and the grid and is configured to deliver the additional voltage from the grid to the second end.

4. The system according to claim 1, wherein the recovery device comprises a suppression filter for eliminating a direct component of the additional voltage.

5. The system according to claim 4, wherein the recovery device comprises a second transformer connected in output to the suppression filter.

6. The system according to claim 4, wherein the suppression filter includes a capacitor.

7. The system according to claim 1, wherein the conversion device comprises a diode bridge connected in output to the recovery device.

8. The system according to claim 7, wherein the conversion device comprises a filtering capacitor connected in output to the diode bridge.

* * * * *